United States Patent [19]
Chu et al.

[11] Patent Number: 5,722,630
[45] Date of Patent: Mar. 3, 1998

[54] ROD REST

[76] Inventors: I-Tien Chu; Jui-Ho Yang; Huan-Chin Lin, all of P.O. Box 82-144, Taipei, Taiwan

[21] Appl. No.: 714,201

[22] Filed: Sep. 16, 1996

[51] Int. Cl.$^6$ ............................................. F16M 13/00
[52] U.S. Cl. ............................................. 248/514; 43/21.2
[58] Field of Search ............................ 248/166, 514, 248/516, 520, 538; 43/21.2

[56] References Cited

U.S. PATENT DOCUMENTS

| | | | |
|---|---|---|---|
| 3,906,653 | 9/1975 | Williams | 43/21.2 |
| 5,359,803 | 11/1994 | Shieh | 43/21.2 |
| 5,367,815 | 11/1994 | Liou | 43/21.2 |
| 5,400,996 | 3/1995 | Drish | 248/514 X |
| 5,560,137 | 10/1996 | Herring | 248/514 X |

Primary Examiner—Ramon O. Ramirez
Attorney, Agent, or Firm—A & F

[57] ABSTRACT

A rod rest including a holder frame, a main support having a barrel at the bottom pivoted to the holder frame at one end; two anchoring bars pivoted to the holder frame at an opposite end; an auxiliary support pivotably fastened to the main support by a wing screw; a locating shaft turned in the barrel of the main support and connected between the holder frame and a circular coupling plate; brake means mounted in an axial cut in the locating shaft, and a lever adapted for releasing the brake means; wherein when the main support is turned outwards relative to the anchoring bars, it is released from the constraint of the brake means and allowed to be turned outwards further; when the main support is turned inwards toward the anchoring bars, the brake means is forced into braking position to stop the main support from turning.

1 Claim, 6 Drawing Sheets

ROD REST

BACKGROUND OF THE INVENTION

1. Field of the Invention

This invention relates to rod rests for supporting fishing rods, and relates more particularly to such a rod rest which can be conveniently and positively adjusted to hold the fishing rod at the desired angle.

2. Description of the Prior Art

FIG. 1 shows a rod rest for supporting a fishing rod according to the prior art. This structure of rod rest comprises a holder frame 17, a pair of anchoring bars 11 pivoted to the holder frame 17, a sleeve 14 having rear extension rod 13 fastened to the holder frame 17 by a tightening up screw 18, a main support 12 having a bottom end connected to rear extension rod 13 and a top end terminating in a locating ring 19 for holding the fishing rod, and an auxiliary support 16 having one end inserted into the sleeve 14 and fixed by a tightening up screw 141 and an opposite end terminating in a rack 15 for holding the fishing rod. This structure of rod rest is not satisfactory in function. Because the adjusting angles of the sleeve 14 and the main support 12 relative to the holder frame 17 and the anchoring bars 11 are limited, the anchoring bars 11 must be fastened to the ground so that the main support 12 and the auxiliary support 16 can be set in position for supporting the fishing rod. Therefore, this structure of rod rest is not suitable for mounting on rocks. Furthermore, using a tightening up screw cannot firmly secure the sleeve 14 or the auxiliary support 16 in position.

SUMMARY OF THE INVENTION

This invention relates to rod rests for supporting fishing rods, and relates more particularly to such a rod rest which can be conveniently and positively adjusted to hold the fishing rod at the desired angle.

According to the preferred embodiment of the present invention, the rod rest comprises a holder frame having a coupling disk at one end; a main support having a barrel at the bottom pivoted to the coupling disk of the holder frame; two anchoring bars having a respective toothed end meshed together and pivoted to the holder frame at one end remote from the coupling disk; an auxiliary support pivotably fastened to the main support by a wing screw; a circular coupling plate fixedly fastened to the holder frame; a locating shaft revolvably mounted within the barrel and fixedly connected between the coupling disk of the holder frame and the circular coupling plate and having a radial slot and a triangular axial cut at the periphery; a retainer rod axially mounted in the axial cut of the locating shaft and radially supported on a compression spring; a locating block mounted in the radial slot of the locating shaft and stopped at the retainer rod against the compression spring; a lever adapted for turning the locating block; wherein when the main support is turned outwards relative to the anchoring bars, the retainer rod is moved from a narrower area of the axial cut to a broader area thereof, permitting the main support to be turned outwards further; when the main support is turned inwards toward the anchoring bars, the retainer rod is moved from the broader area of the axial cut to the narrower area thereof and then firmly engaged between the barrel and the locating shaft to stop the main support from turning; the main support is allowed to be turned inwards and outwards relative to the anchoring bars when the locating block is turned by the lever to force the retainer rod away from the narrow area of the triangular chamber toward the broader area thereof.

DETAILED DESCRIPTION OF THE PREFERRED EMBODIMENT

Figure 1:
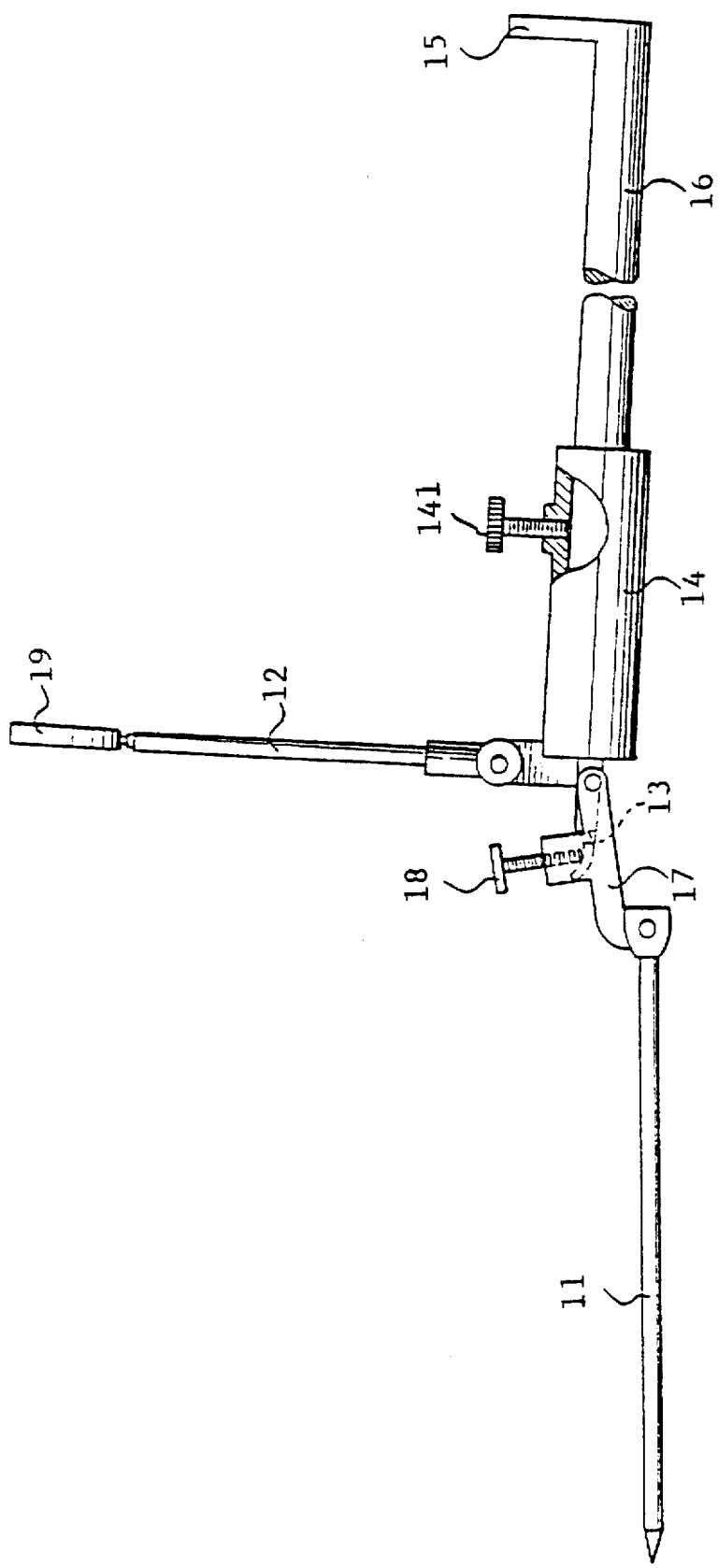
FIG. 1 is an elevational view of a rod rest according to the prior art.
Figure 2:
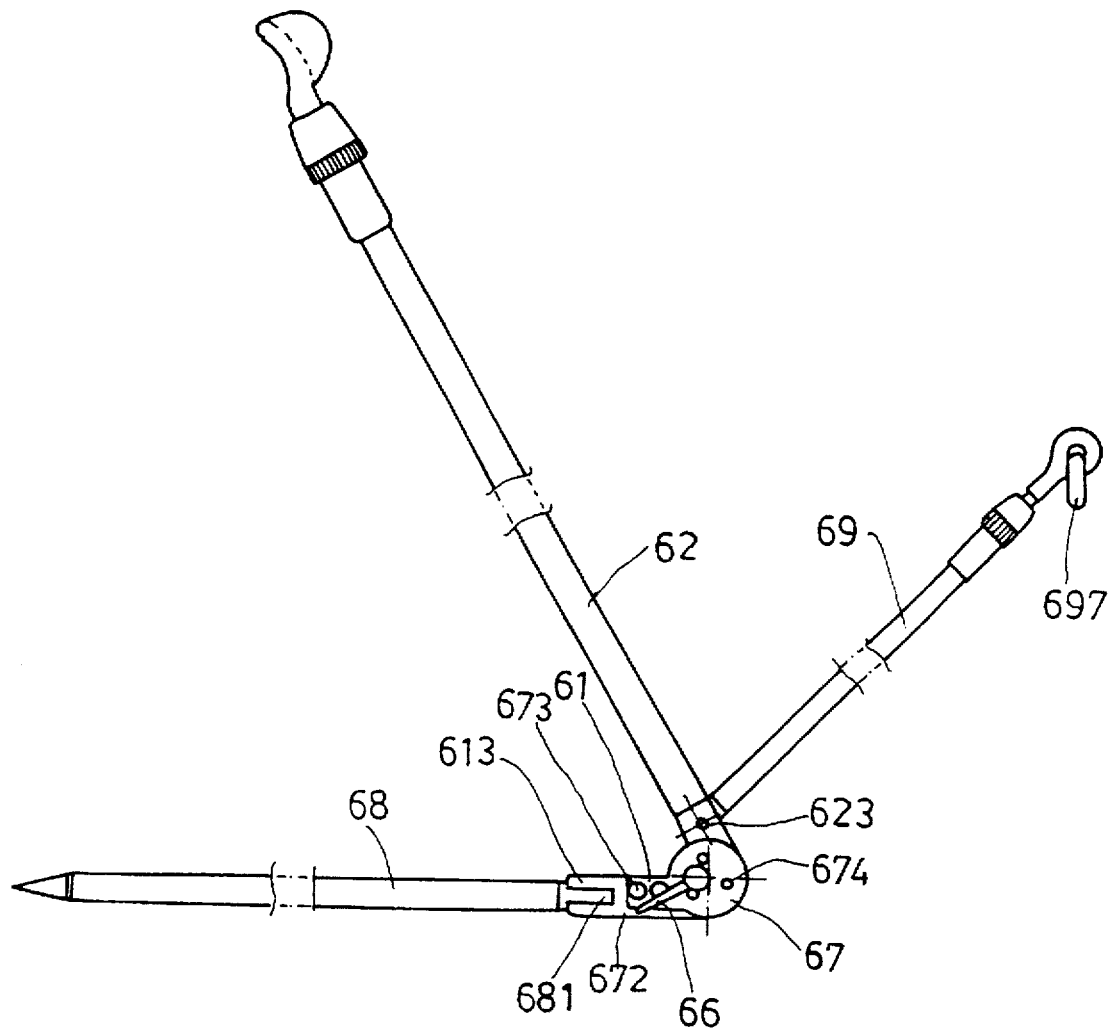
FIG. 2 is a side view of a rod rest according to the present invention.
Figure 3:
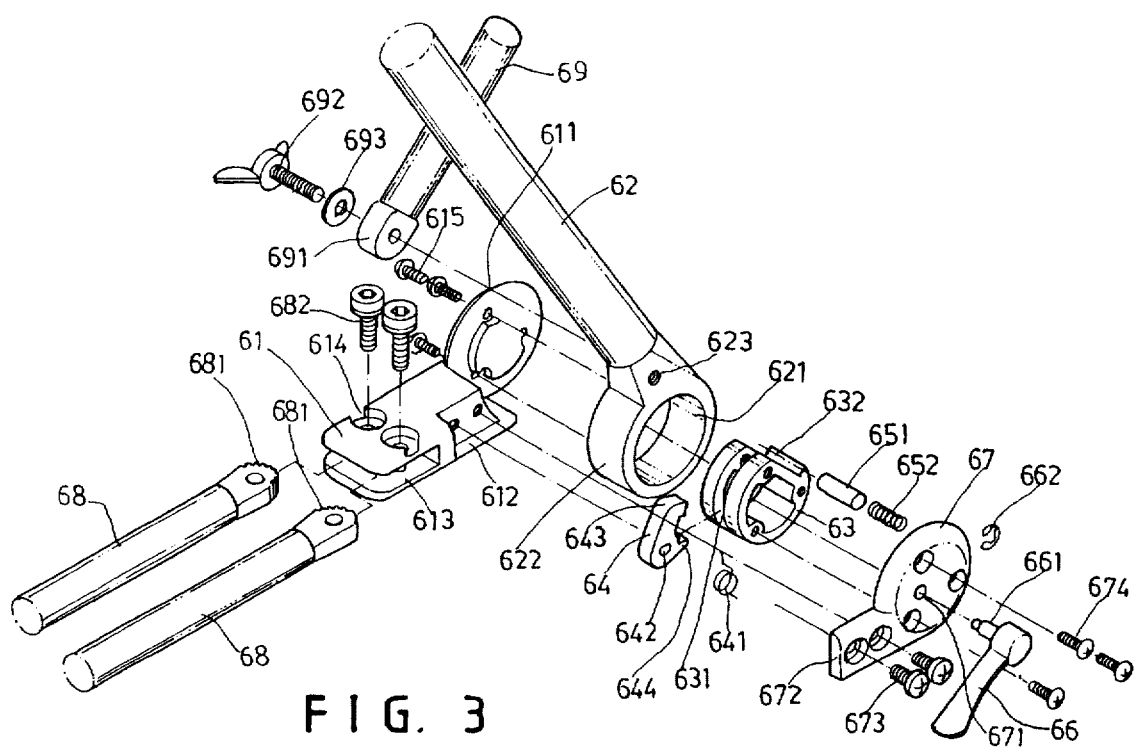
FIG. 3 is an exploded view of the rod rest shown in FIG. 2.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring to FIGS. from 2 to 6, a rod rest in accordance with the present invention is generally comprised of a holder frame 61, a main support 62, a locating shaft 63, a locating block 64, a torsional spring 641, a retainer rod 651, a compression spring 652, a lever 66, a circular coupling plate 67, two anchoring bars 68, and an auxiliary support 69.

The holder frame 61 comprises a coupling disk 611 perpendicularly raised from one end, a recess 612 in the middle, a transverse slot 613 at one end remote from the coupling disk 611, and two countersunk holes 614 respectively intersecting the transverse slot 613. The main support 62 is adapted for supporting a fishing rod, having a barrel 622 at one end defining a center through hole 621, and a screw hole 623 adjacent to the barrel 622. The locating shaft 63 is revolvably mounted within the center through hole 621 of the barrel 622 and connected between the coupling disk 611 of the holder frame 61 and the circular coupling plate 67 by screws 615, 674, comprising a radial slot 631 in the middle, which receives the locating block 64, and an axial cut 632. The axial cut 632 has a triangular cross section. The compression spring 652 is radially mounted in the axial cut 632 of the locating shaft 63. The retainer rod 651 is axially mounted in the axial cut 632 inside the barrel 622 of the main support 62, and radially supported on the compression spring 652. The compression spring 652 imparts a pressure to the retainer rod 651, causing the retainer rod 651 to be forced into engagement with the periphery of the center through hole 621 of the barrel 62. The locating block 64 comprises an oblong hole 642 in the middle, a curved stop portion 643 at one end, and a projection 644 at an opposite end to which one end of the torsional spring 641 is connected. The torsional spring 641 is connected to the circular coupling plate 67 to impart a pressure to the locating block 64 against the retainer rod 651. The lever 66 has a coupling rod 661 perpendicularly raised from one end, and fastened to a hole 671 in the circular coupling plate 67 by a clamp 662. The circular coupling plate 67 has a radial projecting bar 672 fastened to the recess 612 of the holder frame 61 by screws 673. The anchoring bars 68 have a respective peripherally toothed, flat coupling eye 681 at one end. The peripherally toothed, flat coupling eyes 681 of the anchoring bars 68 are respectively inserted into the transverse slot 613 of the holder frame 61 and meshed together, and then respectively and pivotably connected to the countersunk holes 614 by a respective screw bolt 682. The auxiliary support 69 has a bottom end 691 fastened to the screw hole 623 by a wing screw 692 and a washer 693, a through hole 694 at a top end thereof, a hanger 697 fastened to the through hole 694 by a washer 696 and a wing nut 695.

Figure 4:
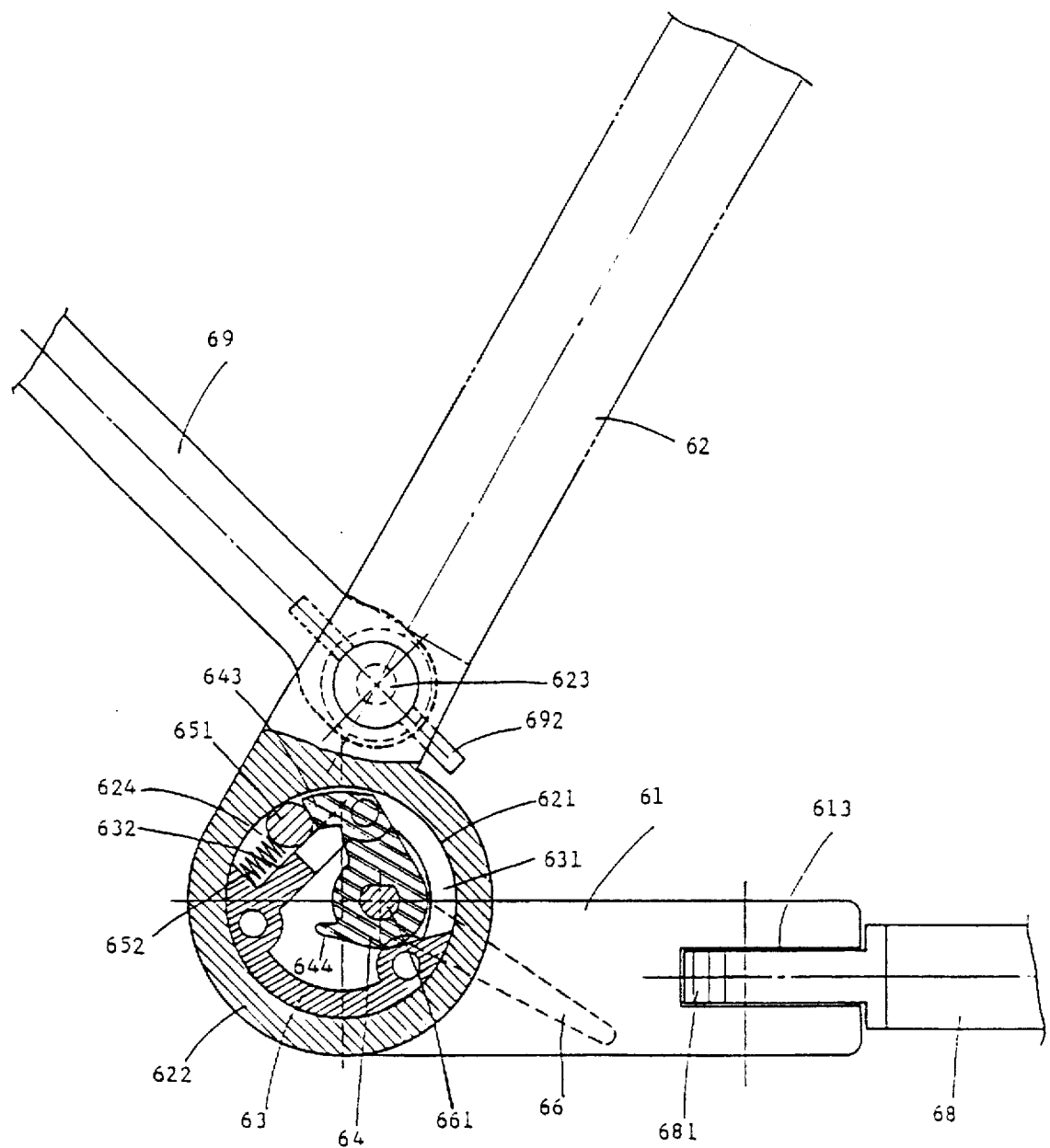
FIG. 4 is a sectional view in an enlarged scale of FIG. 2.
Figure 5:
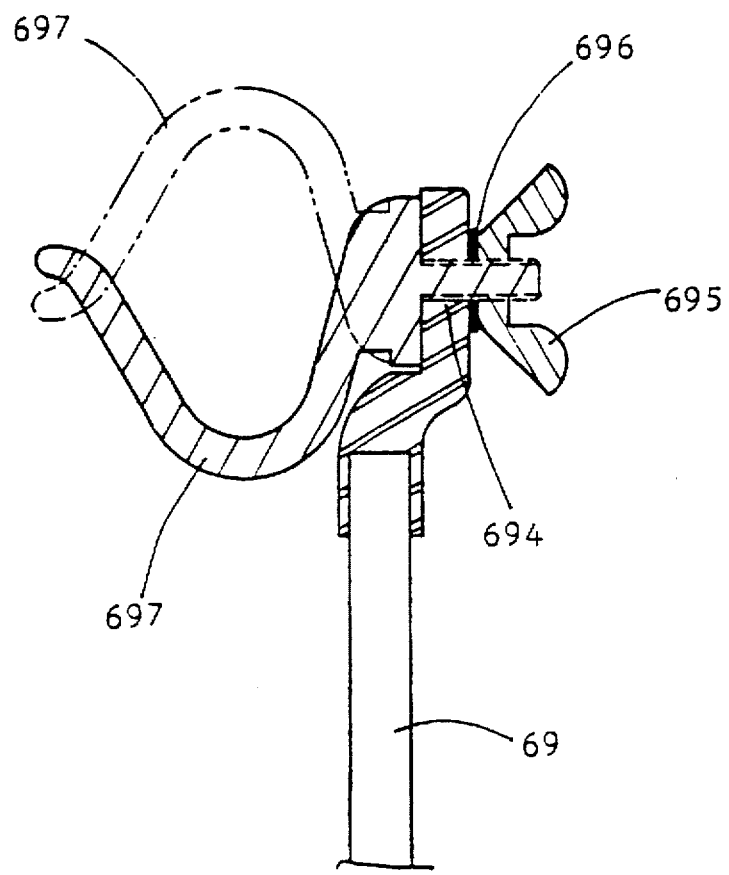
FIG. 5 shows the installation of a hanger in the top end of the auxiliary support according to the present invention; and, FIG. 6 is an applied view of the present invention, showing the angular positions of the anchoring bars, the main support, and the auxiliary support adjusted relative to one another.
Figure 6:
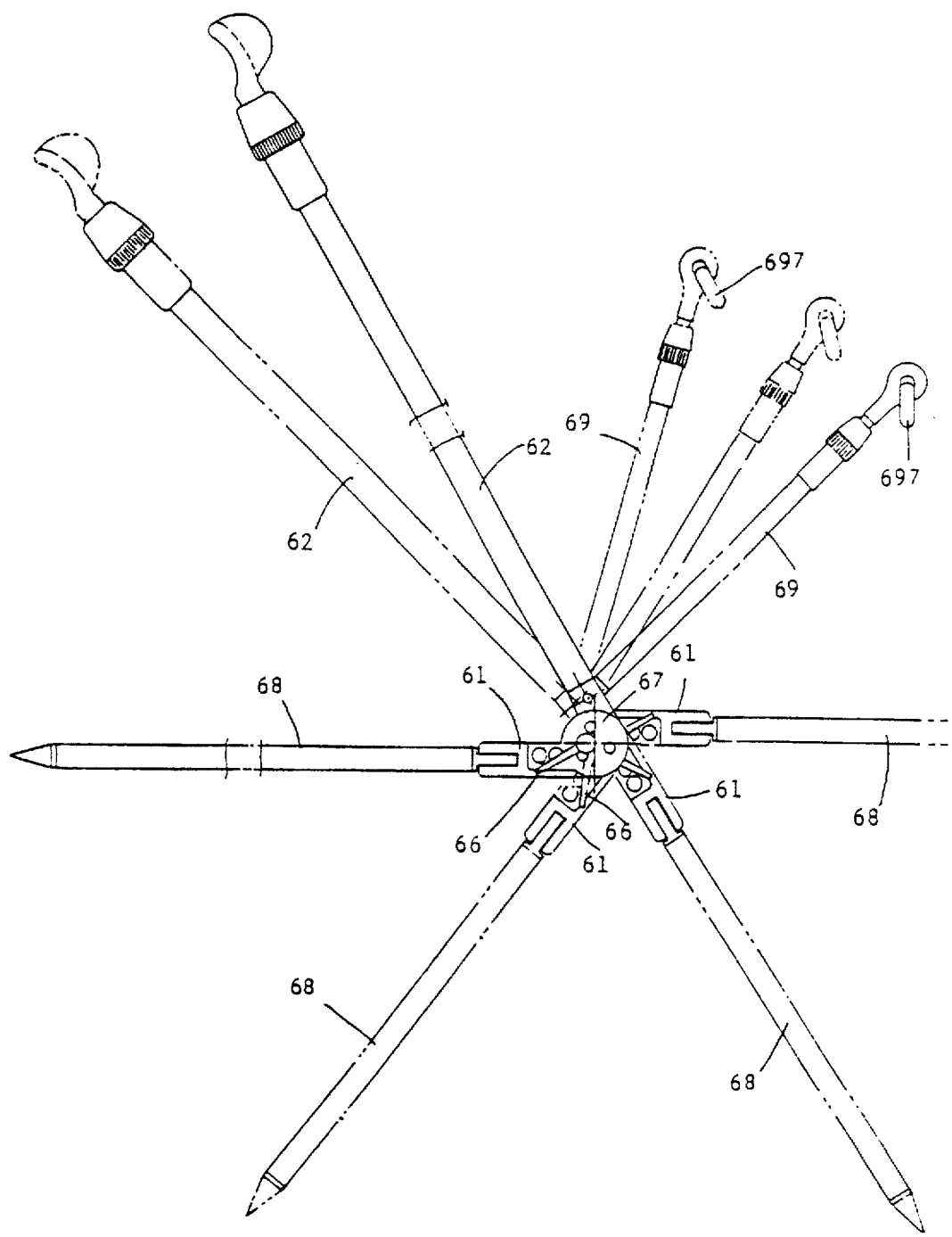

When assembled as shown in FIG. 4, the retainer rod 651 is retained in the axial cut 632 between the compression spring 652 and the curved stop portion 643 of the locating block 64; the axial cut 632 defines with the periphery of the center through hole 621 of the barrel 622 a triangular chamber 624. When the main support 62 is turned outwards relative to the anchoring bars 68, the retainer rod 651 is moved from a narrower area of the triangular chamber 624 to a broader area thereof, and therefore the main support 62 is allowed to be turned outwards. On the contrary, when the main support 62 is turned inwards toward the anchoring bars 68, the retainer rod 651 is moved from the broader area to the narrower area and then firmly engaged between the inside wall of the barrel 622 and the outside wall of the locating shaft 63 to stop the main support 62 from being turned further. When to release the constraint for permitting the main support 62 to be turned inwards toward the anchoring bars 68, the locating block 64 is turned by the lever 66 to force the retainer rod 651 away from the narrower area of the triangular chamber 624 toward the broader area thereof.

The operation procedure of the rod rest is as follows:
1. closing the two anchoring bars 68 together and then fastening them to the ground, or
2. turning the two anchoring bars 68 apart from each other and then securing to a rock or a rigid land surface;
3. turning the main support 62 outwards from the anchoring bars 68 to the desired angle of inclination;
4. loosening the wing screw 692 and then adjusting the angular position of the auxiliary support 69 relative to the main support 62; and
5. Loosening the wing nut 695 and then adjusting the angular position of the hanger 697 relative to the auxiliary support 69, for permitting the fishing rod to be supported on or retained below the hanger 697.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:
1. A rod rest comprising:
   a holder frame, said holder frame comprising a coupling disk at one end, a recess in the middle, a transverse slot at an opposite end and two countersunk holes respectively intersecting said transverse slot;
   a main support coupled to said coupling disk and adapted for supporting a fishing rod, said main support comprising a barrel at a bottom end thereof pivoted to said coupling disk and defining a center through hole, and a screw hole adjacent to said barrel;
   a circular coupling plate having a through hole, and a radial projecting bar fixedly fastened to the recess of said holder frame by screws;
   a locating shaft revolvably mounted within the center through hole of said barrel and connected between the coupling disk of said holder frame and said circular coupling plate by screws, said locating shaft comprising a radial slot in the middle, and a triangular axial cut at the periphery, said triangular axial cut defining with the periphery of the center through hole of the barrel of said main support a triangular chamber having a narrower area at one end and a broader area at an opposite end;
   a compression spring radially mounted in the axial cut of said locating shaft;
   a retainer rod axially mounted in said triangular chamber within the axial cut of said locating shaft and radially supported on said compression spring;
   a locating block mounted in the radial slot of said locating shaft and stopped at said retainer rod against said compression spring, said locating block having an oblong hole in the middle, a curved stop portion at one end stopped at said retainer rod, and a projection at an opposite end;
   a torsional spring fastened to said circular coupling plate and connected to the projection of said locating block to impart a pressure to said locating block, causing the curved stop portion of said locating block to be maintained stopped against said retainer rod;
   a lever having an oblong coupling rod perpendicularly raised from one end and turned in the through hole of said circular coupling plate and fitted into the oblong hole of said locating block for permitting said locating block to be turned with said lever relative to said retainer rod;
   two anchoring bars respectively coupled to said holder frame for anchoring, said anchoring bars having a respective peripherally toothed, flat coupling eye at one end respectively inserted into the transverse slot of said holder frame and meshed together and then respectively and pivotably connected to the countersunk holes of said holder frame by a respective screw bolt; and,
   an auxiliary support having a bottom end fastened to the screw hole of said main support by a wing screw and a washer, a top end made with a through hole, a hanger fastened to the through hole by a washer and a wing nut;
   wherein when said main support is turned outwards relative to said anchoring bars, said retainer rod is moved from the narrower area of said triangular chamber to the broader area thereof, permitting said main support to be turned outwards further; when said main support is turned inwards toward said anchoring bars, said retainer rod is moved from the broader area of said triangular chamber to the narrower area thereof and then firmly engaged between said barrel and said locating shaft to stop said main support from turning; said main support is allowed to be turned inwards and outwards relative to said anchoring bars when said locating block is turned by said lever to force said retainer rod away from the narrow area of said triangular chamber toward the broader area thereof.

* * * * *